US012327388B2

(12) United States Patent
Lu et al.

(10) Patent No.: US 12,327,388 B2
(45) Date of Patent: Jun. 10, 2025

(54) MULTI-CAMERA DOMAIN ADAPTIVE OBJECT DETECTION SYSTEM AND DETECTION METHOD THEREOF

(71) Applicant: National Yang Ming Chiao Tung University, Hsinchu (TW)

(72) Inventors: Peggy Joy Lu, Taichung (TW); Jen-Hui Chuang, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 393 days.

(21) Appl. No.: 17/962,388

(22) Filed: Oct. 7, 2022

(65) Prior Publication Data

US 2024/0020941 A1 Jan. 18, 2024

(30) Foreign Application Priority Data

Jul. 13, 2022 (TW) ................................. 111126368

(51) Int. Cl.
*G06V 10/25* (2022.01)
*G06V 10/774* (2022.01)
*G06V 20/52* (2022.01)

(52) U.S. Cl.
CPC ............ *G06V 10/25* (2022.01); *G06V 10/774* (2022.01); *G06V 20/52* (2022.01); *G06V 2201/07* (2022.01)

(58) Field of Classification Search
CPC ...... G06V 10/25; G06V 10/774; G06V 20/52; G06V 2201/07; G06V 10/764; G06V 10/806
See application file for complete search history.

(56) References Cited

U.S. PATENT DOCUMENTS 8,260,036 B2 9/2012 Hamza et al.
8,965,115 B1 2/2015 Khosla et al.
(Continued)

FOREIGN PATENT DOCUMENTS

CN 106170800 A 11/2016
CN 111680697 A 9/2020
(Continued)

OTHER PUBLICATIONS

Yu et al., "Federated Object Detection: Optimizing Object Detection Model with Federated Learning", ICVISP 2019: 3rd International Conference on Vision, Image and Signal Processing (Year: 2019).*
(Continued)

*Primary Examiner* — Qian Yang
(74) *Attorney, Agent, or Firm* — MUNCY, GEISSLER, OLDS & LOWE, P.C.

(57) ABSTRACT

A multi-camera domain adaptive object detection system and detection method are provided. A server-end device of the system includes a target camera for obtaining target data. Each client-end device of the system includes a source camera for obtaining source data. The system executes procedures of: the server-end device transmits a global model to each client-end device; each client-end device trains the global model according to the target data and corresponding source data to obtain a trained model; each client-end device inputs the target data into the trained model, extracts feature values to obtain a feature data, and transmits each feature data to the server-end device; the server-end device assembles the feature data to obtain multiple loss functions; and the server-end device trains the global model according to the target data and loss functions to obtain a trained global model.

17 Claims, 3 Drawing Sheets

(56) References Cited

U.S. PATENT DOCUMENTS

| | | | |
|---|---|---|---|
| 10,902,270 | B2 | 1/2021 | Mishra et al. |
| 2016/0078339 | A1 | 3/2016 | Li et al. |
| 2017/0371329 | A1 | 12/2017 | Giering et al. |
| 2020/0151497 | A1* | 5/2020 | Kojima .................. G06T 7/11 |
| 2021/0158549 | A1* | 5/2021 | Veeravasarapu ....... G06N 3/045 |
| 2021/0294326 | A1 | 9/2021 | Zheng et al. |

FOREIGN PATENT DOCUMENTS

| | | |
|---|---|---|
| CN | 113269315 A | 8/2021 |
| CN | 114549322 A | 5/2022 |
| TW | 202123047 A | 6/2021 |
| TW | 202123049 A | 6/2021 |
| TW | 202123050 A | 6/2021 |
| TW | 202123123 A | 6/2021 |
| TW | 202127295 A | 7/2021 |
| WO | WO2016100814 A1 | 6/2016 |

OTHER PUBLICATIONS

Liang et al., "Think Locally, Act Globally: Federated Learning with Local and Global Representations", arXiv:2001.01523 (Year: 2020).*
Sada et al., "A Distributed Video Analytics Architecture based on Edge-Computing and Federated Learning", 2019 IEEE Intl Conf on Dependable, Autonomic and Secure Computing (Year: 2019).*
Liu et al., "FedVision: An Online Visual Object Detection Platform Powered by Federated Learning", The Thirty-Second Innovative Applications of Artificial Intelligence Conference (IAAI-20) (Year: 2020).*
Huang et al., "UNET 3+: a Full-Scale Connected UNET for Medical Image Segmentation", ICASSP 2020 (Year: 2020).*
Luo et al., *Real-World Image Datasets for Federated Learning.* (2019). Compouter Science, *ArXiv, abs/1910.11089.*, 8 pgs.
Yu et al.. "*Federated Object Detection: Optimizing Object Detection Model with Federated Learning.*" Proceedings of the 3rd International Conference on Vision, Image and Signal Processing (2019): Association for Computing Machinery, Vancouver, BC, Canada. DOI: https://doi.org/10.1145/3387168.3387181 , 6pgs.
Liu et al., *FedVision: An Online Visual Object Detection Platform Powered by Federated Learning,* 2020, Association for the Advancement of Artificial Intelligence (www.aaai.org)., 8 pgs.
Jallepalli et al., *Federated Learning for Object Detection in Autonomous Vehicles,* 2021, IEEE Seventh International Conference on Big Data Computing Service and Applications (BigDataService), DOI: 10.1109/BigDataService52369.2021.00018, pp. 107-114.
Jiang et al., *Federated Learning Algorithm Based on Knowledge Distillation,* 2020, International Conference on Artificial Intelligence and Computer Engineering (ICAICE), DOI: 10.1109/ICAICE51518.2020.00038, pp. 163-167.
Wu et al., *FedKD: Communication Efficient Federated Learning via Knowledge Distillation,* 2021, communiarXiv: 2108.13323v1, 12 pgs.
Lin et al., *Ensemble Distillation for Robust Model Fusion in Federated Learning,* 34th Conference on Neural Information Processing Systems (NeurIPS) (2020), Vancouver, Canada., pp. 1-13.
Jeong et al., *Communication-Efficient On-Device Machine Learning: Federated Distillation and Augmentation under Non-IID Private Data,* 32nd Conference on Neural Information Processing Systems (NIPS) (2018), 2nd Workshop on Machine Learning on the Phone and other Consumer Devices (MLPCD 2), Montréal, Canada., 6 pgs.
Sattler et al., *CFD: Communication-Efficient Federated Distillation via Soft-Label Quantization and Delta Coding,* Transactions on Network Science and Engineering, pp. 1-14, DOI 10.1109/TNSE. (2021).3081748, IEEE, pp. 1-14.
Bistritz et al., *Distributed Distillation for On-Device Learning,* 34th Conference on Neural Information Processing Systems (NeurIPS) (2020), Vancouver, Canada., pp. 1-12.
He et al., *Group Knowledge Transfer: Federated Learning of Large CNNs at the Edge,* 34th Conference on Neural Information Processing Systems (NeurIPS) (2020), Vancouver, Canada, *arXiv: Learning.,* pp. 1-13.
Deng et al.,. "*Unbiased Mean Teacher for Cross-domain Object Detection.*" 2021 IEEE/CVF Conference on Computer Vision and Pattern Recognition (CVPR) (2021): pp. 4091-4101.
Cai et al., *Exploring Object Relation in Mean Teacher for Cross-Domain Detection.* (2019) IEEE/CVF Conference on Computer Vision and Pattern Recognition (CVPR), pp. 11457-11466.
Tang et al., *Learning Efficient Detector with Semi-supervised Adaptive Distillation.* (2019). *ArXiv, abs/1901.00366.* pp. 1-9.
Sasagawa et al.. *YOLO in the Dark—Domain Adaptation Method for Merging Multiple Models.* (2020), *ECCV.,* pp. 1-15.
Chen et al., *Domain Adaptive Faster R-CNN for Object Detection in the Wild.* (2018) IEEE/CVF Conference on Computer Vision and Pattern Recognition, pp. 3339-3348.
Wang, et al., *Domain-Specific Suppression for Adaptive Object Detection.* (2021) IEEE/CVF Conference on Computer Vision and Pattern Recognition (CVPR), pp. 9603-9612.
Saito et al., *Strong-Weak Distribution Alignment for Adaptive Object Detection.* (2019) IEEE/CVF Conference on Computer Vision and Pattern Recognition (CVPR), 14 pgs.
Zhao et al.. *Collaborative Training between Region Proposal Localization and Classification for Domain Adaptive Object Detection.* (2020), *ArXiv, abs/2009.08119.,* pp. 1-16.
Jiang et al., *Decoupled Adaptation for Cross-Domain Object Detection.* Published as a conference paper at ICLR (2022). *ArXiv, abs/2110.02578.,* pp. 1-15.
Peng et al., *Federated Adversarial Domain Adaptation.* Published as a conference paper at ICLR (2020)., *ArXiv, abs/1911.02054.,* pp. 1-19.
He, Z., & Zhang, L. *Multi-Adversarial Faster-RCNN for Unrestricted Object Detection.* (2019). IEEE/CVF International Conference on Computer Vision (ICCV), pp. 6668-6677.
Shan et al.,. *Pixel and Feature Level Based Domain Adaption for Object Detection in Autonomous Driving.* Neurocomputing, (2019). Elsevier B.V.. 367, pp. 31-38. www.elsevier.com/locate/neucom.
McMahan et al.,. *Communication-Efficient Learning of Deep Networks from Decentralized Data.,* Proceedings of the 20th International Conference on Artificial Intelligence and Statistics (AISTATS) (2017), Fort Lauderdale, Florida, USA. JMLR: W&CP vol. 54, 11 pgs.
Wang et al.,. *Federated Learning with Matched Averaging.* Published as a conference paper at ICLR (2020)., *ArXiv, abs/2002. 06440.,* pp. 1-16.

\* cited by examiner

MULTI-CAMERA DOMAIN ADAPTIVE OBJECT DETECTION SYSTEM AND DETECTION METHOD THEREOF

CROSS REFERENCE TO RELATED APPLICATIONS

This Non-provisional application claims priority under 35 U.S.C. § 119(a) on Patent Application No(s). 111126368 filed in Taiwan, Republic of China on Jul. 13, 2022, the entire contents of which are hereby incorporated by reference.

BACKGROUND

Technology Field

The present disclosure relates to an object detection system and method, and in particular, to a multi-camera domain adaptive object detection system and detection method thereof that can ensure the privacy of each source data.

Description of Related Art

The information required for machine learning involves multiple fields. For example, in the scenario of merchant classification analysis based on machine learning, the electronic payment platform has the transaction flow data of the merchant, the e-commerce platform stores the sales data of the merchant, the banking institution has the loan data of the merchant, etc. The different data often exist in the form of isolated islands. Due to industry competition, data security, user privacy and other issues, data aggregation encounters a great resistance in that it is difficult to aggregate data distributed on various platforms to train the machine learning models. On the premise of ensuring the information and data security, the use of multi-domain data to jointly train machine learning models has become one of the major challenges.

Moreover, in the conventional object detection technology of computer vision field, in order to effectively train a more general object detection model (i.e., a general global model), it is necessary to collect enough data, which is to be achieved by sharing data from surveillance cameras for monitoring different scenes. However, the surveillance cameras that capture human all have privacy concerns. Furthermore, when a large amount of image data is transmitted to a centralized server, the transmission volume is also quite large.

Regarding the existing object detection technology, the domain adaptation has been developed for many years, but most of the solutions are aimed at a single source and a single target. Only recently have methods for multi-sources and single target been proposed. However, these methods also transmit each source data (image data) to a centralized server, so it is still hard to ensure the privacy of the source data.

Therefore, it is desired to develop a multi-camera domain adaptive object detection system and detection method thereof for training a general object detection model that can ensure the privacy of each source data.

SUMMARY

In view of the foregoing, this disclosure is to provide a multi-camera domain adaptive object detection system and detection method thereof for training a general object detection model that can ensure the privacy of each source data.

To achieve the above, this disclosure provides a multi-camera domain adaptive object detection system, which is suitable for training a global model. The object detection system includes a server-end device and a plurality of client-end devices. The server-end device includes a target camera for obtaining one target data. The client-end devices electrically connect the server-end device, and each client-end device includes a source camera for obtaining one corresponding source data. The object detection system executes at least the following processing procedures. Processing procedure one: the server-end device transmits the global model to each of the client-end devices. Processing procedure two: each of the client-end devices trains the received global model according to the target data and the corresponding source data so as to obtain a trained model. Processing procedure three: each of the client-end devices inputs the target data into the trained model, extracts feature values to obtain one corresponding feature data, and transmits each of the corresponding feature data to the server-end device. Processing procedure four: the server-end device assembles the received feature data from the client-end devices to obtain a plurality of loss functions. Processing procedure five: the server-end device trains the global model according to the target data by the loss functions to obtain a trained global model.

In one embodiment, the object detection system further executes: repeating the processing procedures one to five so as to obtain a final global model.

In one embodiment, the final global model is a general global model.

In one embodiment, the source data of the corresponding client-end device includes an image data, and a classification and a coordinate value of an object shown in each picture of the image data.

In one embodiment, each of the feature data includes a feature map and a soft label.

In one embodiment, in the processing procedure four, the server-end device assembles the soft labels of the received feature data from the client-end devices to obtain an ensemble soft label, and further obtains, based on the ensemble soft label, a cross entropy loss function and a bounded alignment loss function.

In one embodiment, the server-end device assembles the soft labels by steps of: using different models to detect a plurality of pictures in the target data to obtain a plurality of object bounding boxes corresponding to each of objects in each of the different models; and removing the object bounding boxes with low confidence scores.

In one embodiment, the server-end device further aggregates the feature maps of the client-end devices to obtain an aggregated feature map, and obtains a hint loss function according to the aggregated feature map.

In one embodiment, in the processing procedure five, the server-end device trains the global model according to the target data, the cross entropy loss function, the bounded alignment loss function and the hint loss function to obtain the trained global model.

To achieve the above, this disclosure also provides a multi-camera domain adaptive object detection method, which is applied with a server-end device and a plurality of client-end devices for training a global model. The server-end device electrically connects the client-end devices and includes a target camera for obtaining one target data, and each of the client-end devices includes a source camera for obtaining one corresponding source data. The object detection method includes the following steps. Step one: the server-end device transmits the global model to each of the client-end devices. Step two: each of the client-end devices trains the received global model according to the target data and the corresponding source data so as to obtain a trained model. Step three: each of the client-end devices inputs the target data into the trained model, extracts feature values to obtain one corresponding feature data, and transmits each of the corresponding feature data to the server-end device. Step four: the server-end device assembles the received feature data from the client-end devices to obtain a plurality of loss functions. Step five: the server-end device trains the global model according to the target data by the loss functions to obtain a trained global model.

In one embodiment, the object detection method further includes a step of: repeating the steps one to five so as to obtain a final global model.

In one embodiment, the final global model is a general global model.

In one embodiment, the source data of the corresponding client-end device includes an image data, and a classification and a coordinate value of an object shown in each picture of the image data.

In one embodiment, each of the feature data includes a feature map and a soft label, and in the step four, the server-end device assembles the soft labels of the received feature data from the client-end devices to obtain an ensemble soft label, and further obtains, based on the ensemble soft label, a cross entropy loss function and a bounded alignment loss function.

In one embodiment, the server-end device assembles the soft labels by steps of: using different models to detect a plurality of pictures in the target data to obtain a plurality of object bounding boxes corresponding to each of objects in each of the different models; and removing the object bounding boxes with low confidence scores.

In one embodiment, the server-end device further aggregates the feature maps of the client-end devices to obtain an aggregated feature map, and obtains a hint loss function according to the aggregated feature map.

In one embodiment, in the step five, the server-end device trains the global model according to the target data, the cross entropy loss function, the bounded alignment loss function and the hint loss function to obtain the trained global model.

As mentioned above, the multi-camera domain adaptive object detection system and detection method of this disclosure are suitable for training a global model. The object detection system and method include the following processing procedures or steps of: the server-end device transmits the global model to each of the client-end devices; each of the client-end devices trains the received global model according to the target data and the corresponding source data so as to obtain a trained model; each of the client-end devices inputs the target data into the trained model, extracts feature values to obtain one corresponding feature data, and transmits each of the corresponding feature data to the server-end device; the server-end device assembles the received feature data from the client-end devices to obtain a plurality of loss functions; and the server-end device trains the global model according to the target data by the loss functions to obtain a trained global model. Since this disclosure transmits the feature data instead of the source data from the client-end devices to the server-end device, it is possible to ensure the privacy of the source data while training a general object detection model.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
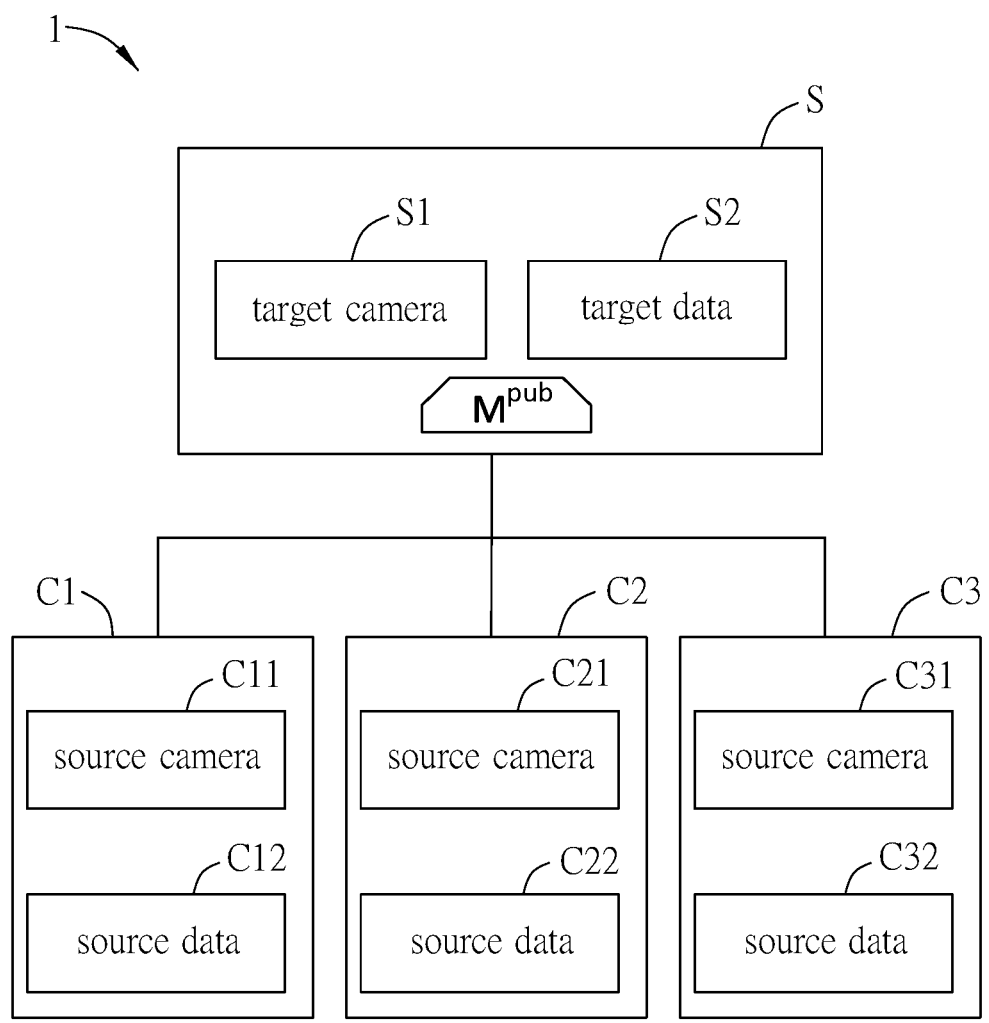
FIG. 1 is a schematic diagram showing the devices of a multi-camera domain adaptive object detection system according to an embodiment of this disclosure.
Figure 2:
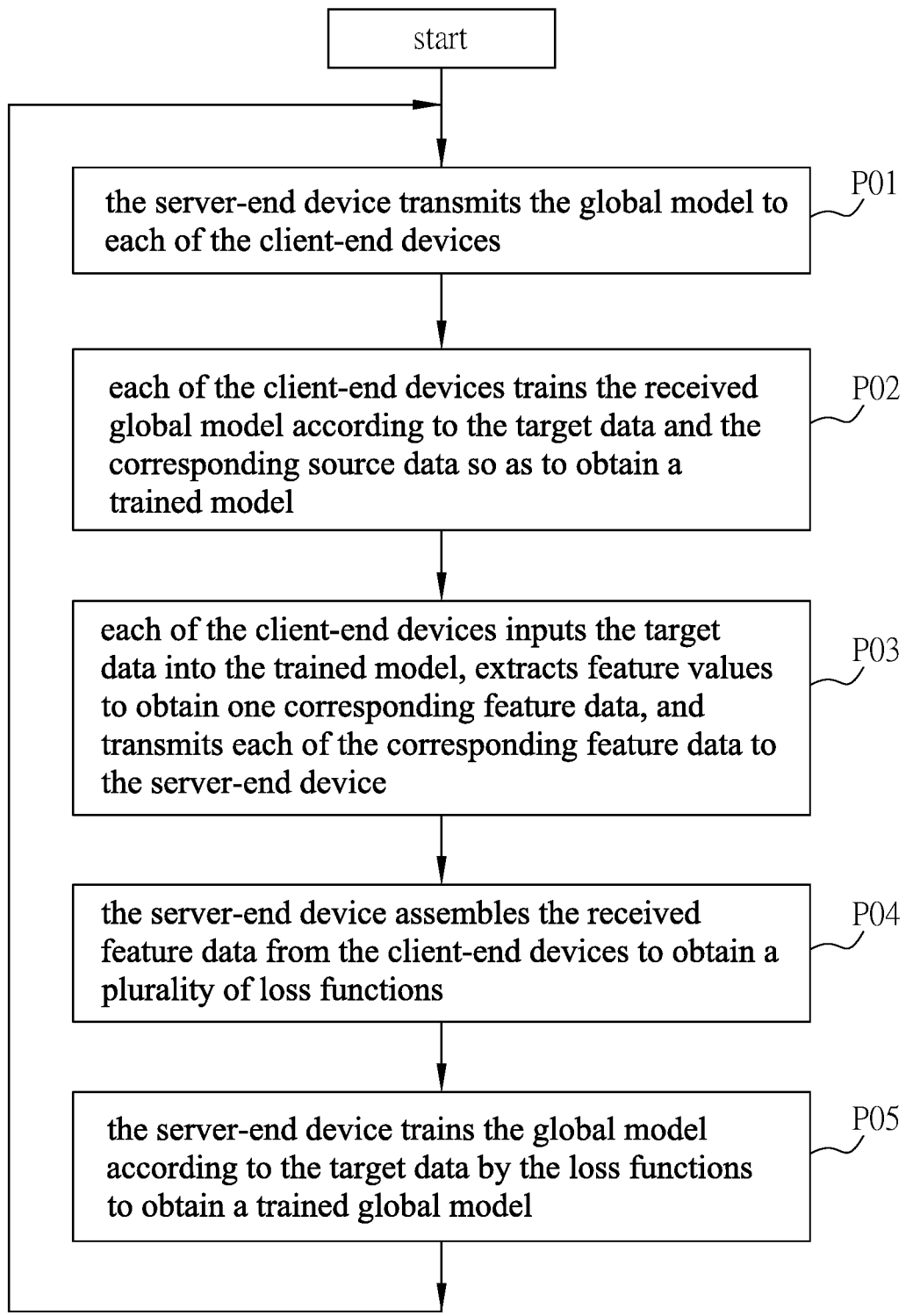
FIG. 2 is a flow chart showing the processing procedures executed by the multi-camera domain adaptive object detection system according to the embodiment of this disclosure.
Figure 3:
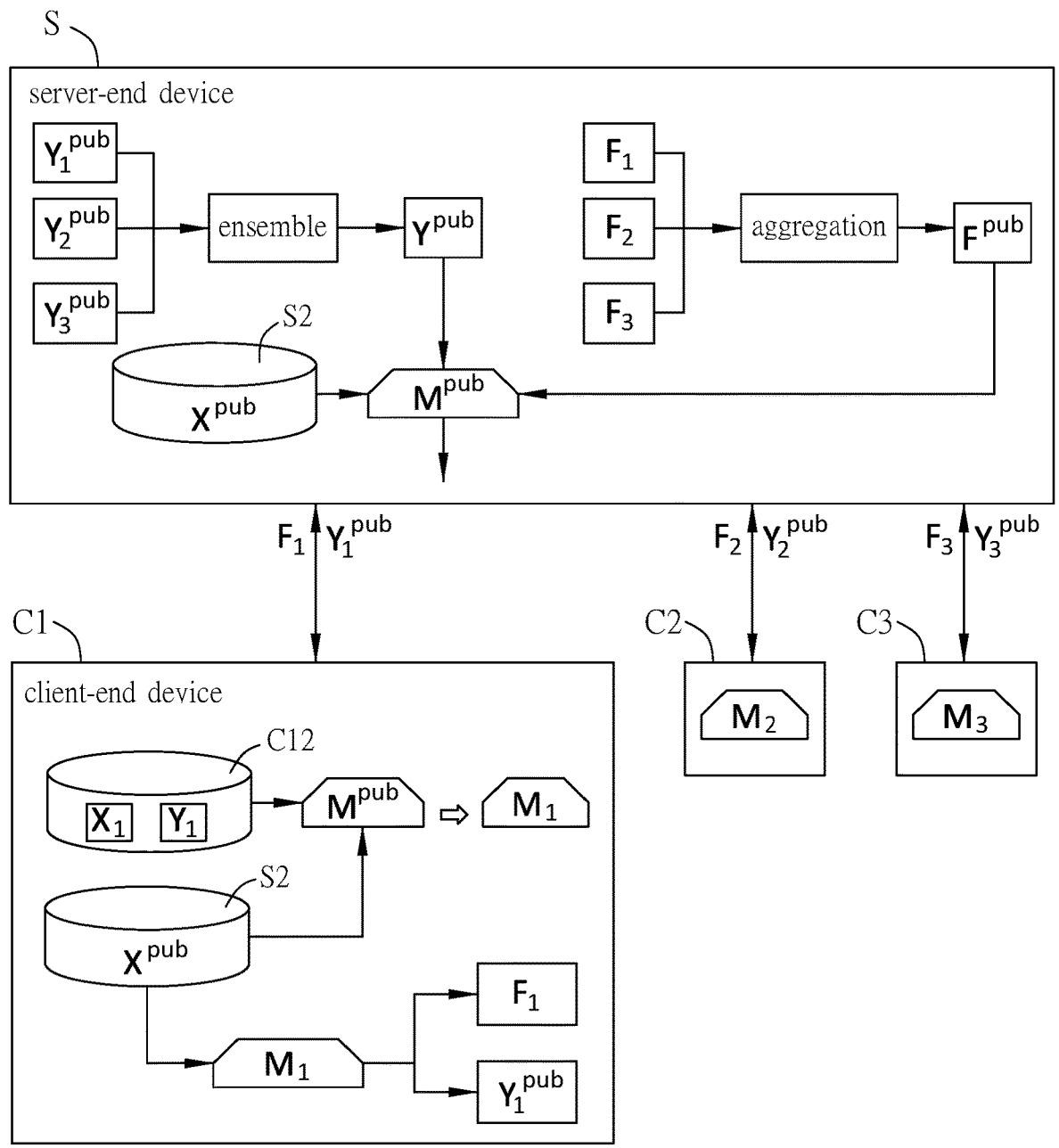
FIG. 3 is a schematic diagram showing the functions of the multi-camera domain adaptive object detection system according to the embodiment of this disclosure.

FIG. 1 is a schematic diagram showing the devices of a multi-camera domain adaptive object detection system according to an embodiment of this disclosure, FIG. 2 is a flow chart showing the processing procedures executed by the multi-camera domain adaptive object detection system according to the embodiment of this disclosure, and FIG. 3 is a schematic diagram showing the functions of the multi-camera domain adaptive object detection system according to the embodiment of this disclosure. To be noted, although FIG. 1 shows three client-end devices C1, C2 and C3 as an example, this disclosure is not limited thereto. In other embodiments, the number of the client-end devices can be 2 or more than 3.

Referring to FIGS. 1 to 3, the multi-camera domain adaptive object detection system 1 of this embodiment is suitable for training a global model. In this embodiment, the object detection system 1 includes a server-end device S and a plurality of client-end devices C1, C2 and C3.

The server-end device S at least includes a target camera S1 for obtaining one target data S2. Specifically, the target data S2 may include the image data XPu b (as shown in FIG. 3) captured by the target camera S1 at the place where the server-end device S is, wherein the target data S2 does not contain a label.

The client-end devices C1, C2 and C3 electrically connect the server-end device S. To be noted, the term "electrically connect" includes the wired connection and/or wireless connection, so that the electrically connected devices can transmit data to each other. In this embodiment, the client-end device C1 includes a source camera C11 for obtaining the source data C12, the client-end device C2 includes a source camera C21 for obtaining the source data C22, and the client-end device C3 includes a source camera C31 for obtaining the source data C32. The source data C12 of the client-end device C1 has the corresponding image data $X_1$, the source data C22 of the client-end device C2 has the corresponding image data $X_2$, and the source data C32 of the client-end device C3 has the corresponding image data $X_3$. Each of the image data $X_1$, $X_2$ and $X_3$ includes a plurality of pictures. In addition, the source data C12 includes the classification and coordinate value ($Y_1$) of an object shown in each picture of the image data $X_1$, the source data C22 includes the classification and coordinate value ($Y_2$) of an object shown in each picture of the image data $X_2$, and the source data C32 includes the classification and coordinate value ($Y_3$) of an object shown in each picture of the image data $X_3$. The coordinate value of the object can define the object bounding boxes (BBs) of the object. To be noted, FIG. 3 does not show $X^{pub}$, $M^{pub}$ and corresponding C22, $X_2$, $Y_2$ of the client-end device C2, and $X^{pub}$, $M^{pub}$ and corresponding C32, $X_3$, $Y_3$ of the client-end device C3.

The operations of the object detection system 1 of this embodiment will be described based on the processing procedures as shown in FIG. 2 in view of FIG. 3.

As shown in FIG. 2, the object detection system 1 of this embodiment at least executes the following processing procedures P01~P05. To be noted, before starting the processing procedure one P01, the server-end device S needs to transmit the target data S2 to the client-end devices C1, C2 and C3, so that the client-end devices C1, C2 and C3 can perform the following procedures based on the received target data S2 (image data $X^{pub}$). In some embodiments, the server-end device S can further include a server, which comprises at least one processor unit and at least one memory unit for executing the processing procedures P01~P05. Moreover, the client-end devices C1, C2 and C3 further includes an electronic device, which also comprises at least one processor unit and at least one memory unit for executing the processing procedures P01~P05. In general, the processor unit may include a core control assembly, which contains, for example, at least one CPU (central processing unit), one GPU (graphics processing unit), and one memory, or the processor unit may include any of other control hardware, software or firmware. Therefore, the above-mentioned processing procedures and other operations can be executed by the processing unit of the server or the electronic device. For example, the memory unit can be a digital data storage device, which is configured to store, for example, algorithms, software instructions and data for execution by the processing unit.

Referring to FIGS. 2 and 3, in the processing procedure one P01, the server-end device S transmits the global model $M^{pub}$ to each of the client-end devices C1, C2 and C3. In this embodiment, the global model $M^{pub}$ is an initial model with initial parameters, which is a model before being trained with the target data S2 and the sources data C12, C22 and C32 (e.g. a non-trained neural network).

Next, in the processing procedure two P02, each of the client-end devices C1, C2 and C3 trains the received global model according to the target data S2 and the corresponding source data C12, C22 and C32 so as to obtain a trained model (e.g. a trained model $M_1$, a trained model $M_2$ and a trained model $M_3$). In this embodiment, the global model $M^{pub}$ can be "trained" by, for example, utilizing an unsupervised domain adaptation training method or any of domain adaptive object detection methods, and this disclosure is not limited thereto. As shown in FIG. 3, in this embodiment, the client-end device C1 trains the initial global model $M^{pub}$ with the received and recognized source data C12 (including $X_1$ and $Y_1$) and the target data S2 so as to obtain a trained model $M_1$. Similarly, the client-end device C2 trains the initial global model $M^{pub}$ with the received and recognized source data C22 (including $X_2$ and $Y_2$) and the target data S2 so as to obtain a trained model $M_2$, and the client-end device C3 trains the initial global model $M^{pub}$ with the received and recognized source data C32 (including $X_3$ and $Y_3$) and the target data S2 so as to obtain a trained model $M_3$.

After that, in the processing procedure three P03, each of the client-end devices C1, C2 and C3 inputs the target data S2 into the trained models $M_1$, $M_1$ and $M_3$ respectively, extracts feature values to obtain the feature data corresponding to the client-end devices C1, C2 and C3 respectively, and then transmits each of the corresponding feature data to the server-end device S. As shown in FIG. 3, the client-end device C1 takes the target data S2 as a model input to further train the trained model $M_1$, and then extracts the corresponding feature value from the trained model $M_1$ to obtain the feature data corresponding to the client-end device C1. Similarly, the client-end device C2 takes the target data S2 as a model input to further train the trained model $M_2$, and then extracts the corresponding feature value from the trained model $M_2$ to obtain the feature data corresponding to the client-end device C2, and the client-end device C3 takes the target data S2 as a model input to further train the trained model $M_3$, and then extracts the corresponding feature value from the trained model $M_3$ to obtain the feature data corresponding to the client-end device C3. Herein, the feature maps $F_1$, $F_2$ and $F_3$ contain the compositions of low-level features for describing the corresponding image characteristic, and each of the soft labels $Y_1^{pub}$, $Y_2^{pub}$ and $Y_3^{pub}$ indicates the probability distribution of different classes.

In this embodiment, the feature data of the client-end device C1 includes a feature map $F_1$ and a soft label $Y_1^{pub}$, the feature data of the client-end device C2 includes a feature map $F_2$ and a soft label $Y_2^{pub}$, and the feature data of the client-end device C3 includes a feature map $F_3$ and a soft label $Y_3^{pub}$. Herein, the feature maps $F_1$, $F_2$ and $F_3$ contain the compositions of low-level features for describing the corresponding image characteristic, and each of the soft labels $Y_1^{pub}$, $Y_2^{pub}$ and $Y_3^{pub}$ indicates the probability distribution of different classes. Moreover, the client-end device C1 can transmit the corresponding feature map $F_1$ and the soft label $Y_1^{pub}$ to the server-end device S, the client-end device C2 can transmit the corresponding feature map $F_2$ and the soft label $Y_2^{pub}$ to the server-end device S, and the client-end device C3 can transmit the corresponding feature map $F_3$ and the soft label $Y_3^{pub}$ to the server-end device S. As a result, the client-end devices C1, C2 and C3 only respectively transmit the feature maps $F_1$, $F_2$ and $F_3$ and the soft labels $Y_1^{pub}$, $Y_2^{pub}$ and $Y_3^{pub}$ retrieved from the models $M_1$, $M_2$ and $M_3$ to the server-end device S, and the source data C12, C22 and C32, which include the corresponding image data, are not transmitted. Accordingly, the data transmission amount can be reduced, and the privacy of the source data C12, C22 and C32 from the client-end devices C1, C2 and C3, respectively, can be ensured.

Afterwards, in the processing procedure four P04, the server-end device S assembles the received feature data from the client-end devices C1, C2 and C3 to obtain a plurality of loss functions. For example, the loss functions may include one or more of cross entropy loss function, bounded alignment loss function and/or hint loss function. In this processing procedure P04, the server-end device S assembles the soft labels $Y_1^{pub}$, $Y_2^{pub}$ and $Y_3^{pub}$ received from the client-end devices C1, C2 and C3, respectively, to obtain an ensemble soft label $Y^{pub}$, and then obtains a cross entropy loss function and a bounded alignment loss function based on the ensemble soft label $Y^{pub}$. In this embodiment, the cross entropy loss comes from object classifications, and the bounded alignment loss comes from the object bounding boxes (BBs) of coordinates. In some embodiments, the server-end device S assembles the soft labels $Y_1^{pub}$, $Y_2^{pub}$ and $Y_3^{pub}$ by steps of: using different models to detect a plurality of pictures in the target data to obtain a plurality of object bounding boxes corresponding to each object in each of the different models (i.e., to obtain the object bounding boxes of a plurality of marked objects); and removing the object bounding boxes with low confidence scores. In this embodiment, each model can recognize each object in the pictures and calculate the confidence score for the classification of each object. Specifically, each object bounding box has a corresponding confidence score, wherein "a higher confidence score" indicates a higher possibility that the object of the object bounding box is the determined classification, while "a lower confidence score" indicates a lower possibility that the object of the object bounding box is the determined object classification. Moreover, for the multiple object bounding boxes of each object classification, the server-end device S can further execute the following steps of: identifying pairs of inter-domain object bounding boxes with reasonable IOUs (Intersection over Unions) (i.e., mapping the object bounding boxes), removing the object bounding boxes with lower or smaller confidence scores for each bounding boxes pair, and considering the remaining object bounding boxes for further processing.

In addition, the server-end device S further aggregates the feature maps $F_1$, $F_2$ and $F_3$ from the client-end devices C1, C2 and C3 to obtain an aggregated feature map $F^{pub}$, and obtains a hint loss function according to the aggregated feature map $F^{pub}$. In this embodiment, the aggregation step can be performed with any suitable aggregation algorithm such as, for example but not limited to, average model weight, comparison weights of every layer in model, or the like. Accordingly, in the processing procedure four P04, the loss functions include a cross entropy loss function, a bounded alignment loss function and a hint loss function.

Next, in the processing procedure five P05, the server-end device S trains the global model $M^{pub}$ according to the target data S2 by the loss functions to obtain a trained global model. In this processing procedure five P05, since the feature data have been assembled to obtain a plurality of loss functions (e.g. the cross entropy loss function, the bounded alignment loss function and the hint loss function), the server-end device S can train the global model $M^{pub}$ according to the target data S2, the cross entropy loss function, the bounded alignment loss function and the hint loss function to obtain new model parameters, thereby obtaining a new (trained) global model.

After that, as shown in FIG. 2, the above-mentioned five processing procedures P01~P05 can be repeated so as to update the global model parameters to obtain the final global model. In this case, the designer can set the times for repeating the processing procedures or set a preset condition for terminating repeating loop, thereby obtaining a general global model that is well trained based on artificial intelligence. The obtained general global model can improve the accuracy of object classification and coordinate identification in the image data.

As mentioned above, in the object detection system 1 of this embodiment, each of the client-end data (i.e. the source data C12, C22, C32) is used to train the corresponding model, the feature data (including the soft labels $Y_1^{pub}$, $Y_2^{pub}$ and $Y_3^{pub}$ and the feature maps $F_1$, $F_2$ and $F_3$) are extracted from each of the client-end devices, and then the feature data are transmitted from the client-end devices C1, C2 and C3 to the server-end device S instead of the source data C12, C22 and C32 (image data). Afterwards, the server-end device S can assemble the received feature data to obtain a general global model, which can improve the labeling accuracy of object detection. As a result, the multi-camera domain adaptive object detection system 1 of this embodiment not only has a smaller transmission amount, but also can ensure the privacy of the source data C12, C22 and C32 of client-end devices C1, C2 and C3.

In addition, the object detection system 1 of this embodiment builds a multi-camera monitoring system that can preserve privacies. This system can create multiple models after learning from a plurality of different source data, and only the feature data are transmitted and assembled. Accordingly, the client-end data (e.g. the source data C12, C22 and C32) are not disclosed, and a model can be trained with maintaining privacy of client-end data, thereby assembling and generating a general global model, which can be applied to new target domains in the future.

This disclosure also provides a multi-camera domain adaptive object detection method, which is applied with a server-end device and a plurality of client-end devices for training a global model. The object detection method includes the following five steps. In step one, the server-end device transmits the global model to each of the client-end devices. In step two, each of the client-end devices trains the received global model according to the target data and the corresponding source data so as to obtain a trained model. In step three, each of the client-end devices inputs the target data into the trained model, extracts feature values to obtain one corresponding feature data, and transmits each of the corresponding feature data to the server-end device. In step four, the server-end device assembles the received feature data from the client-end devices to obtain a plurality of loss functions. In step five, the server-end device trains the global model according to the target data by the loss functions to obtain a trained global model. Furthermore, the object detection method further includes a step of: repeating the steps one to five so as to obtain a final global model, wherein the final global model can be a general global model. To be understood, the steps one to five can refer to the above-mentioned processing procedures one to five, so the detailed descriptions thereof will be omitted.

In addition, the other technical features of the multi-camera domain adaptive object detection method can refer to the above-mentioned object detection system 1, so the detailed descriptions thereof are also omitted.

In summary, the multi-camera domain adaptive object detection system and detection method of this disclosure are suitable for training a global model. The object detection system and method include the following processing procedures or steps of: the server-end device transmits the global model to each of the client-end devices; each of the client-end devices trains the received global model according to the target data and the corresponding source data so as to obtain a trained model; each of the client-end devices inputs the target data into the trained model, extracts feature values to obtain one corresponding feature data, and transmits each of the corresponding feature data to the server-end device; the server-end device assembles the received feature data from the client-end devices to obtain a plurality of loss functions; and the server-end device trains the global model according to the target data by the loss functions to obtain a trained global model. Since this disclosure transmits the feature data instead of the source data from the client-end devices to the server-end device, it is possible to ensure the privacy of the source data while training a general object detection model.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A multi-camera domain adaptive object detection system, which is suitable for training a global model, comprising:

a server-end device including a target camera for obtaining one target data, wherein the target data includes an image data captured by the target camera; and a plurality of client-end devices electrically connecting the server-end device, wherein each of the client-end devices comprises a source camera for obtaining one corresponding source data;

wherein, the object detection system executes at least following processing procedures:

processing procedure one: the server-end device transmits the global model to each of the client-end devices;

processing procedure two: each of the client-end devices trains the received global model according to the image data captured by the target camera and the corresponding source data so as to obtain a trained model;

processing procedure three: each of the client-end devices inputs the image data captured by the target camera into the trained model, extracts feature values to obtain one corresponding feature data, and transmits each of the corresponding feature data to the server-end device;

processing procedure four: the server-end device assembles the received feature data from the client-end devices to obtain a plurality of loss functions; and processing procedure five: the server-end device trains the global model according to the target data by the loss functions to obtain a trained global model, wherein, before starting the processing procedure one, the server-end device transmits the image data captured by the target camera to each of the client-end devices.

2. The object detection system of claim 1, further executing:

repeating the processing procedures one to five so as to obtain a final global model.

3. The object detection system of claim 2, wherein the final global model is a general global model.

4. The object detection system of claim 1, wherein the source data of the corresponding client-end device comprises an image data, and a classification and a coordinate value of an object shown in each picture of the image data.

5. The object detection system of claim 1, wherein each of the feature data comprises a feature map and a soft label.

6. The object detection system of claim 5, wherein in the processing procedure four, the server-end device assembles the soft labels of the received feature data from the client-end devices to obtain an ensemble soft label, and further obtains, based on the ensemble soft label, a cross entropy loss function and a bounded alignment loss function.

7. The object detection system of claim 6, wherein the server-end device assembles the soft labels by steps of:

using different models to detect a plurality of pictures in the target data to obtain a plurality of object bounding boxes corresponding to each of objects in each of the different models; and removing the object bounding boxes with low confidence scores.

8. The object detection system of claim 6, wherein the server-end device further aggregates the feature maps of the client-end devices to obtain an aggregated feature map, and obtains a hint loss function according to the aggregated feature map.

9. The object detection system of claim 8, wherein in the processing procedure five, the server-end device trains the global model according to the target data, the cross entropy loss function, the bounded alignment loss function and the hint loss function to obtain the trained global model.

10. A multi-camera domain adaptive object detection method, which is applied with a server-end device and a plurality of client-end devices for training a global model, wherein the server-end device electrically connects the client-end devices and includes a target camera for obtaining one target data, the target data includes an image data captured by the target camera, and each of the client-end devices comprises a source camera for obtaining one corresponding source data, the object detection method comprising steps of:

step one: the server-end device transmits the global model to each of the client-end devices;

step two: each of the client-end devices trains the received global model according to the image data captured by the target camera and the corresponding source data so as to obtain a trained model;

step three: each of the client-end devices inputs the image data captured by the target camera into the trained model, extracts feature values to obtain one corresponding feature data, and transmits each of the corresponding feature data to the server-end device;

step four: the server-end device assembles the received feature data from the client-end devices to obtain a plurality of loss functions; and step five: the server-end device trains the global model according to the target data by the loss functions to obtain a trained global model, wherein, before starting the step one, the server-end device transmits the image data captured by the target camera to each of the client-end devices.

11. The object detection method of claim 10, further comprising a step of:

repeating the steps one to five so as to obtain a final global model.

12. The object detection method of claim 11, wherein the final global model is a general global model.

13. The object detection method of claim 10, wherein the source data of the corresponding client-end device comprises an image data, and a classification and a coordinate value of an object shown in each picture of the image data.

14. The object detection method of claim 10, wherein each of the feature data comprises a feature map and a soft label, and in the step four, the server-end device assembles the soft labels of the received feature data from the client-end devices to obtain an ensemble soft label, and further obtains, based on the ensemble soft label, a cross entropy loss function and a bounded alignment loss function.

15. The object detection method of claim 14, wherein the server-end device assembles the soft labels by steps of:

using different models to detect a plurality of pictures in the target data to obtain a plurality of object bounding boxes corresponding to each of objects in each of the different models; and removing the object bounding boxes with low confidence scores.

16. The object detection method of claim 14, wherein the server-end device further aggregates the feature maps of the client-end devices to obtain an aggregated feature map, and obtains a hint loss function according to the aggregated feature map.

17. The object detection method of claim 16, wherein in the step five, the server-end device trains the global model according to the target data, the cross entropy loss function, the bounded alignment loss function and the hint loss function to obtain the trained global model.

* * * * *